INVENTORS
FRANCIS E. J. THOLEY
ROBERT D. MAREK
BY
ATTORNEY

United States Patent Office 3,462,586
Patented Aug. 19, 1969

3,462,586
DOPPLER NAVIGATION SYSTEM
Francis E. J. Tholey and Robert D. Marek, Hatboro, Pa., assignors, by direct and mesne assignments, to the United States of America as represented by the Secretary of the Navy
Filed June 27, 1966, Ser. No. 561,661
Int. Cl. G06g 7/78
U.S. Cl. 235—150.27    16 Claims

ABSTRACT OF THE DISCLOSURE

This invention relates generally to Doppler pulse navigation systems and more particularly to a more simplified digital Doppler pulse data processor for use in navigation systems of all aircraft and especially those of the rotary wing type.

---

The observation that a beam of energy transmitted from and reflected back to a moving source undergoes a frequency shift or Doppler shift, the magnitude of which is dependent upon the velocity and direction of movement of the energy source away from or toward the reflecting surface, has long been used as a basis for the design of Doppler navigation systems. It has been discovered that by the use of the Doppler shift of three or more of these appropriately directed beams, vector representations of aircraft movements along heading and across heading could be obtained.

The use of known Doppler navigation systems involves utilization of complex alignment procedures and continued system maintenance and environmental control. Also, the known systems, while accurate, include several adjustable elements which must be coincidentally adjusted for satisfactory operation. As often occurs, the reliability of these systems is greatly impaired when any of these elements become disaligned.

Further, the known systems for obtaining electrical representations of geographical movement vectors from electrical aircraft-referenced vectors all use analog vector resolvers which, while accurate, are easily subjected to disalignment; and if the aircraft-referenced vector information is in digital form the known systems further require digital to analog converters. Both of these usually derogate reliability.

It is also known that pitch and roll of an aircraft affects the accuracy of the output of a Doppler navigation system. Consequently, pitch compensation is desirable particularly when the aircraft travels for long periods of time in a pitched attitude as, for example, when a helicopter is being used to tow a water-borne object. Roll compensation is particularly desirable when the aircraft maintains a tight circular course for long periods of time.

Some systems have attempted to overcome the error introduced by pitch and roll by including costly gimbaling apparatus for maintaining the Doppler beam transmitting and receiving antenna array in a constant attitude with respect to the earth. Other systems contemplate the use of a fixed antenna array and the solution of complex equations containing functions of pitch and roll angles.

Additionally, systems heretofore known incorporate as a design factor the assumption that the heading velocity component will always be larger than the drift or cross heading velocity component, making no provision for the possibility that the aircraft may be actually moving relative to the earth in a direction radically different from its heading direction as when, for example, wind velocity referenced to ground exeeds aircraft velocity.

The general purpose of this invention is to provide a digital Doppler pulse processor for obtaining electrical outputs indicative of the geographical movement of the aircraft which processor embraces all the advantages of similarly employed systems and possesses none of the aforedescribed disadvantages. To attain this, the highly reliable digital Doppler pulse processor of the present invention includes a small number of essential components than do the known systems, which components, without previous alignment, directly convert pulse trains representative of the Doppler shifts of the beams into pulse trains representative of the geographical movement of the aircraft without the necessity of use of analog resolvers. Further, the present invention contemplates the provision of a unique circuit for adding pulses to selected pulse trains to compensate for errors introduced by aircraft pitch and roll which circuit obviates the necessity for the solution of complex equations and includes no advance effects of consequence in comparison to the advantages experienced.

An object of the present invention is the provision of a highly reliable, small, compact, lightweight digital Doppler pulse processor for obtaining geographical movement information which system includes a smaller number of essential components than known systems and easily lends itself to microminiaturization.

Another object of the invention is to provide a Doppler pulse processor particularly compatible with a fixed continuous wave Doppler beam antenna array.

A further object of the invention is the provision of unique means for compensating for the error introduced into a Doppler navigation system output by the pitch and roll of the aircraft.

Still another object is to provide a novel digital pulse processor for automatically obtaining the geographical vectors indicative of the actual movement of the aircraft irrespective of the difference between the heading of the aircraft and the actual movement of said aircraft, which processor is particularly suited for use in rotary wing aircraft.

Yet another object is the provision of an improved, highly reliable digital pulse handling system which avoids the necessity of using analog resolvers for obtaining geographical movement vectors from aircraft referenced vectors.

A still further object is the provision of a digital pulse processor which needs no initial alignment prior to use.

Other objects and advantages of the invention will hereinafter become more fully apparent from the following description of the annexed drawings, which illustrate a preferred embodiment, and wherein:

Figure 1:
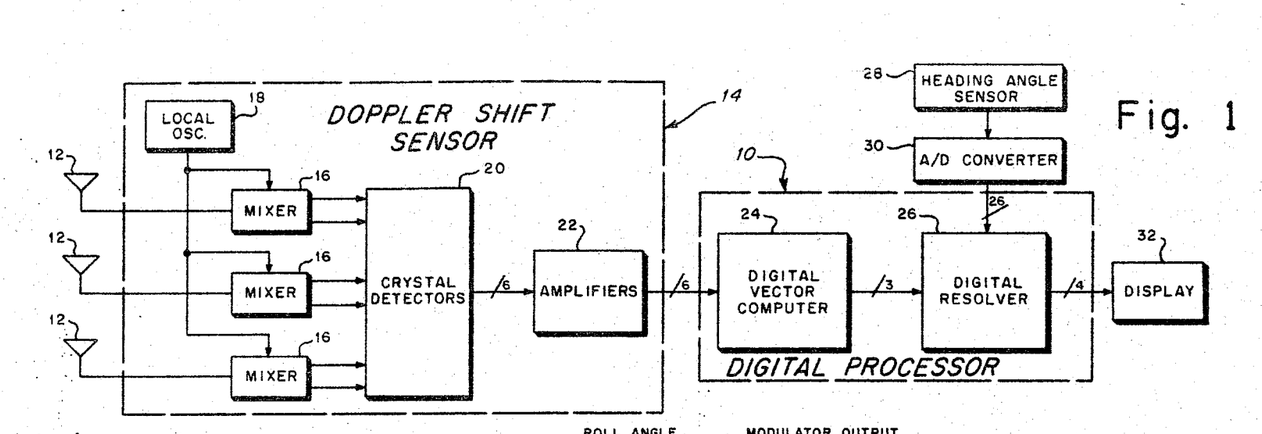
FIG. 1 is a block diagram of a portion of an aircraft Doppler navigation system including a digital Doppler pulse processor according to the invention.
Figure 2:
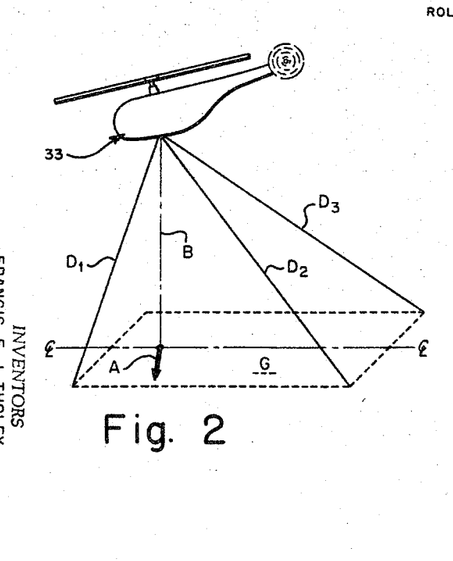
FIG. 2 is a pictorial representation of a helicopter including an antenna array, as applied to the system of FIG. 1, transmitting and receiving three Doppler beams along directions toward and from a reflecting surface.

In order to more specifically describe the Doppler pulse data handling system according to the invention, a description of a preferred input into the digital Doppler pulse processor 10 of FIG. 1 is pertinent. Referring to FIG. 2 the pitched helicopter 33 carries a Doppler beam antenna array (not shown) which transmits and receives Doppler beams $D_1$ extending forward of the helicopter 33 and to one side, $D_2$ extending rearwardly and to the same side with the same deviation from the antenna array vertical axis as $D_1$, and $D_3$ extending to the opposite side and rearwardly with the same deviation as $D_2$. Aircraft movement generally represented by arrow A projected on ground level indicated by plane G extends from a point on plane G where an imaginary vertical line B passing through the antenna array of the helicopter 33 intersects said plane G.

While a multi-beam antenna array of any selected beam orientation could be used with Doppler pulse data handling systems according to the invention, the described beam orientation wherein two beams are aligned along heading and two beams are aligned across heading is preferred in that the embodiment of the Doppler pulse data processor compatible therewith is of a simpler construction and utilizes a smaller number of components. Doppler beam antenna arrays of the type described are well known in the art of Doppler navigation systems and are commercially available.

The embodiment of the data pulse processor 10 according to the invention hereinafter described is compatible with either an intermittent reception system or a continous wave reception system, it being desirable that the Doppler shifts of the various beams be simulated by appropriate circuitry included in the sensor 14 during periods of antenna transmission if an intermittent system is used. The embodiment of the digital processor 10 will perhaps more easily be understood when described in connection with received outputs from a continuous wave antenna array system.

There is schematically shown in FIG. 1 a receiver antenna 12 for each of the Doppler beams $D_1$, $D_2$ and $D_3$, the microwave output of each antenna being fed into a respective channel of a Doppler shift sensor 14. The preferred output from the sensor 14 comprises for each received Doppler beam a pair of square waves each having a frequency equal to the Doppler shift for that particular beam.

The received Doppler beams are each fed by a wave guide into a wave guide mixer 16 where the received beam is fed into two channels of an appropriately shaped wave guide. A small portion of the output from a local oscillator 18, which may be a klystron used to supply the transmitted beam frequency, is fed via a wave guide into the two wave guide channels of the mixer 16 through a pair of cross-slot microwave couplers, well known in the art. These couplers are physically positioned one-quarter wavelength apart so that the received beam frequencies may be modulated by the difference frequency between the transmitted and the respective received frequencies, the modulated output of one channel of mixer 16 being 90° out of phase with the modulated output from the other channel of that mixer.

These difference frequency modulated outputs are fed into respective crystal detectors 20 for detection and rectification, and then into respective audio amplifiers 22 which each include at their front ends a low pass filter to eliminate the carrier frequency, that is, the respective received beam frequency. The resulting audio signals are each amplified by their respective amplifiers 22 and clipped to produce square wave outputs each having a frequency equal to the respective difference between that of the transmitted beam and that of the respective received beam, which outputs comprise the preferred inputs to the Doppler pulse data processor 10.

The audio outputs from the amplifiers 22 representing the Doppler shifts of the various beams are fed into a digital vector computer 24, which computer selectively adds and subtracts selected Doppler shifts to produce a pair of computer outputs comprising first and second series of pulses respectively representative of aircraft movement along heading and aircraft movement across heading. These computer outputs are fed into a digital resolver 26.

A heading angle sensor 28 produces a pair of analog outputs which vary respectively sinusoidally and cosinusoidally with the deviation of the heading of the aircraft from North. The output of the sensor 28 is fed into an analog-to-digital converter 30 which produces converter outputs in the form of parallel arrays of conducting and non-conducting output bits which arrays are respectively representative of the polarity and magnitude of the sine and cosine of the heading angle and are all fed to the digital resolver 26 of the Doppler pulse data processor 10. Alternatively, instead of the sensor 28 and the analog-to-digital converter 30, a digital shaft encoder productive of parallel digital outputs indicative of heading angle sine and cosine could be used.

The digital resolver 26 digitally multiplies the received computer outputs by the received converter outputs, selectively combines the resulting products to produce therefrom two series of pulses, and selectively directs said series of pulses to appropriate cardinal direction output points, the series of pulses appearing at a given cardinal direction output point being representative of the aircraft movement in that direction.

The serial outputs from the resolver 26 of the system 10 are fed into an appropriate display device 32. Since the resolver outputs are proportional over a period of time to corresponding velocity components, a constant scale factor dependent upon the beam orientation relative to the aircraft and upon the processor count down rate can be built into the display device 32 used.

Several types of display devices may be used. One suitable form includes a respective step motor for each output point which rotates a certain number of degrees in response to reception of a pulse to drive a mechanical counter. Also, such step motors could be used to drive an X–Y recorder or North-South and East-West potentiometers which in turn respectively control the horizontal and vertical deflection circuitry of a cathode ray tube. Further, the resolver outputs could be fed into respective bucket counters, well known in the art, which effectively integrate the pulsating output appearing at a selected cardinal direction output point, the magnitudes of which integrations may be read by appropriate meters. Alternatively, the pulsating outputs could be fed directly into visual displays for digital computers which are also well known in the art.

Figure 3:
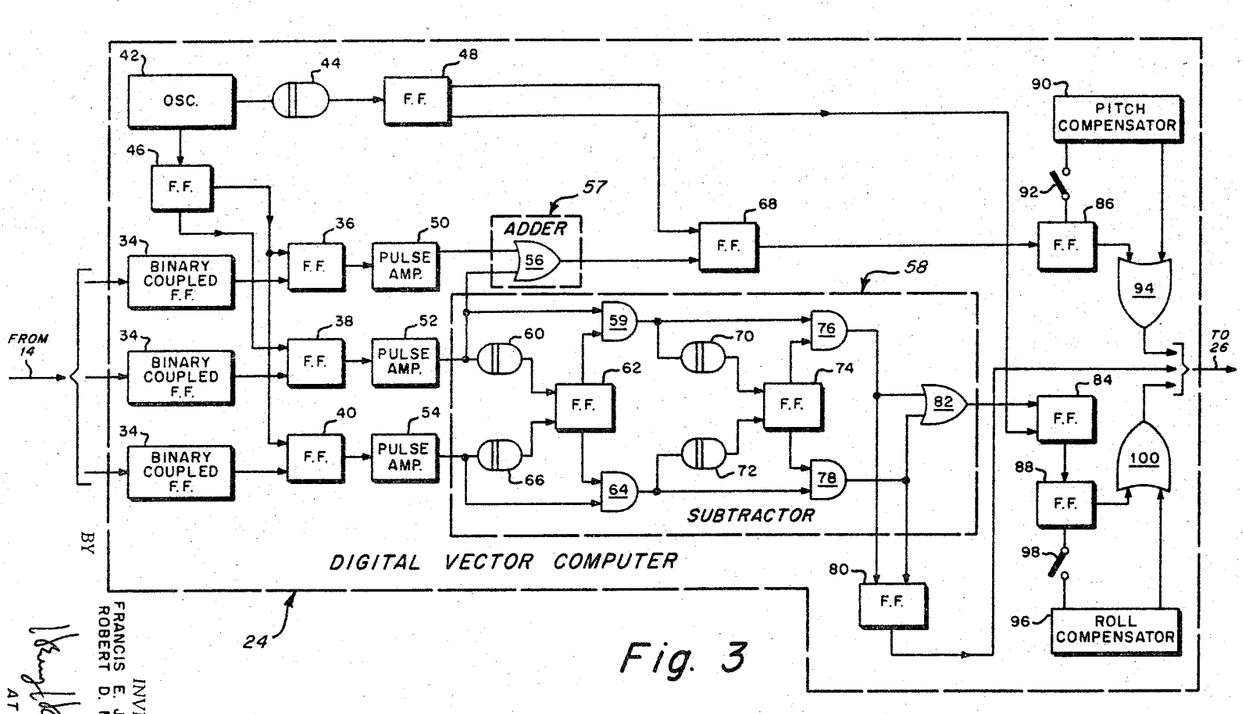
FIG. 3 is a more detailed block diagram of the digital vector computer as employed in the Doppler pulse processor of FIG. 1.

Referring now to FIG. 3, one embodiment of the digital vector computer 24 is shown. Those square wave outputs from amplifiers 22 which have not been phase shifted relative to each other are respectively produced from the mixing of the received beam frequencies and the transmitted frequency of the same phase are each fed into respective trains of binary coupled flip-flops 34 whose function is to reduce or count down the audio frequency of the Doppler shift in anticipation of the preferred input frequency of the Doppler shift in anticipation of the preferred input frequency of the selected display device 32. Effectively, the same half of the pairs of outputs from each channel are being fed into the computer 24 disclosed in FIG. 3; and the portions of the sensor 14 needed to obtain two, out-of-phase square waves representing the Doppler shift of each beam need not be included in the sensor 14. The respective outputs of the trains of flip-flops 34 are fed into respective reset inputs of the respective flip-flops 36, 38 and 40.

Since in ordinary forward flight beam $D_1$ experiences a frequency increase upon reflection by reason of the fact that the aircraft is approaching the reflection point thereof, since beam $D_2$, which is aligned with beam $D_1$ in the aircraft heading direction, experiences a decreasing frequency by reason of the fact that the aircraft is moving away from the reflection point thereof and since beam $D_3$ would ordinarily also experience a decreasing frequency by reason of the fact that the aircraft is moving away from the reflection point thereof, the sum of the Doppler shifts of $D_1$ and $D_2$ will give a frequency proportional to the aircraft velocity along heading, while the difference between the Doppler shifts of the beams $D_2$ and $D_3$ will give a frequency which is proportional to the aircraft cross heading velocity.

The oscillator 42 and associated delay means 44 and flip-flops 46, 48 comprise a means to obtain noncoincidence in time of each of the pulses in the Doppler shift trains which are to be mixed. The oscillator 42 produces a noncritical frequency which is much higher than the anticipated audio frequencies of outputs from the flip-flops 34 as, for example, 100 kc. This 100 kc. output is fed to flip-flop 46 which produces a first pulsating output of 50 kc. which, in turn, is fed to the set inputs of flip-flops 36 and 40 and a second pulsating output of 50 kc. delayed a very short time such as 10 microseconds with respect to the first output and fed to the set input of flip-flop 38. The flip-flops 36, 38 and 40 each produce an output pulse when changed from a reset to a set condition, the flip-flop 38 always being set at least 10 microseconds after the flip-flops 36 and 40, thereby achieving noncoincidence between those pulses proportional in frequency to the Doppler shift of beam $D_2$ and either those proportional to the Doppler shift of beam $D_1$ or those proportional to the Doppler shift of beam $D_3$. The pulses proportional to the frequency shifts of $D_1$ and $D_2$ consequently may be digitally added, and the pulses proportional to the frequency shifts of $D_2$ and $D_3$ may be digitally subtracted. Alternatively to use of the oscillator 42, outputs could be taken from the initial stage of one of the trains 34 to provide a series of pulses for achieving the above described noncoincidence.

The outputs of the flip-flops 36, 38 and 40 are fed into respective pulse amplifiers 50, 52 and 54 which are optionally included to provide pulses of sufficient amplitude to activate the flip-flops successively encountered in the circuit. The output of pulse amplifier 50 is fed to one input of OR gate 56 of adder 57. The output of pulse amplifier 52 is fed to the other input of the OR gate 56 and into subtractor 58 to one input of AND gate 59 and through delay device 60 to a set input of flip-flop 62. The output of pulse amplifier 54 is also fed into the subtractor 58 to an input of AND gate 64 and through delay device 66 to a reset input of flip-flop 62. The pulse amplifiers 52 and 54 may be of the blocking oscillator type having a first output pulse and a second output pulse delayed with respect to the first, thereby eliminating the hereinafter explained need for separate delay devices 60 and 66.

The train of pulses from pulse amplifier 50 and the noncoincident train of pulses from pulse amplifier 52 are added in the adder 58 by OR gate 56 and fed to the reset input of flip-flop 68, the OR gate output having a frequency proportional to the sum of the Doppler shifts of beams $D_1$ and $D_2$.

The relatively constant output produced by flip-flop 62 when set is fed to the other input of AND gate 58, while that produced by flip-flop 62 when reset is fed to the other input of AND gate 64. Consequently, when a pulse is received from pulse amplifier 52, the AND gate 58 will not pass that pulse unless flip-flop 62 has been set by a preceding pulse which was delayed through device 66. Similarly, AND gate 64 will not pass a pulse received from pulse amplifier 54 unless flip-flop 62 has been reset by a preceding pulse delayed through device 66

The device 60 delays each pulse received from the amplifier 52 for a sufficient time so that flip-flop 60 will not change from a reset condition to a set condition in time to produce the set output fed to AND gate 59 which would allow passage of the pulse directly received by AND gate 59 from pulse amplifier 52. The above-indicated delay is, however, shorter than the minimum expected time between a pulse output by amplifier 52 and a pulse output by amplifier 54, i.e., 10 microseconds, so that upon receipt of a pulse from amplifier 52 delayed through device 60 flip-flop 62 can change from reset to set condition before a pulse from amplifier 54 is received by AND gate 64. The device 66 functions similarly with respect to the change of flip-flop 62 from set condition to reset condition.

Therefore, it appears that AND gate 59 will not pass a pulse unless two succeeding pulses are received from amplifier 52 before pulse amplifier 54 produces an output pulse. Conversely, AND gate 64 will produce no output pulse unless two succeeding pulses are received from amplifier 54 before amplifier 52 produces an output pulse.

From the foregoing, it is seen that there is obtained from AND gate 58 a train of pulses which is proportional to the difference between the Doppler shifts of beams $D_2$ and $D_3$, $D_2$ having the greater Doppler shift. Conversely, if the Doppler shift of beam $D_3$ is greater than that of beam $D_2$, a train of pulses will be passed through AND gate 64 which train is proportional to the difference between the two Doppler shifts.

The output pulses of AND gate 59 and the output pulses of AND gate 64 are fed into a similar subtraction circuit including similarly connected delay devices 70, 72, flip-flop 74, and AND gates 76 and 78, which additional pulse subtraction is optionally provided to assure that the appropriate difference frequency is always received from one AND gate or the other. This second subtraction circuit operates in the same manner as the first discussed subtraction circuit, for the train of pulses proportional to the difference between the frequency shifts of Doppler beams $D_2$ and $D_3$ appear as an output of AND gate 76 when $D_2$ has the greater shift and, alternatively, as an output of AND gate 76 when $D_3$ has the greater shift, which outputs are fed respectively to the inputs of OR gate 82. OR gate 82 passes a train of pulses which is proportional to the difference between the Doppler shifts of beams $D_2$ and $D_3$ to the set input of flip-flop 84.

Since digital information indicating which of the frequency shifts of beams $D_2$ and $D_3$ is the greater is needed in selecting for combination the proper aircraft-referenced vector components to produce geographically referenced vectors, the output of AND gates 76 and 78 are also respectively fed to the set and reset inputs of flip-flop 80. The flip-flop 80 produces an output when set by a pulse received from AND gate 76, which output is fed to a relay driver in the digital resolver 26 and indicates that the frequency of shift of beam $D_2$ is greater than that of beam $D_3$.

The pulsating outputs of the flip-flops 68, 84 after optional modification in frequency to compensate for pitch and roll are to be selectively combined in the digital resolver 26 to achieve geographically referenced vectors.

Since both outputs of OR gates 56 and 82 may contain some pulses which time coincident with those of the pulse train indicating the frequency shift of $D_2$, flip-flops 68 and 84 are respectively set and reset by first delayed and second further delayed outputs from flip-flop 48 which is being first set and then reset by the output from the oscillator 42 delayed through delay device 44. Alternatively, the same effect could be achieved by delaying each of the set inputs to flip-flops 36, 38 and 40 a different length of time.

The aircraft-referenced movement vectors respectively represented by the pulsing outputs of flip-flops 68, 84 as indicated above, are fed to respective flip-flops 86 and 88. Pulses from flip-flop 68 appear alternately at the two output points of flip-flop 86, the output from one of which points may be selectively fed into the pitch compensating circuit 90 by closing switch 92. The output of pitch compensator 90, hereinafter discussed, is fed along with the output from the other output point of flip-flop 86 to inputs of the optionally included OR gate 94 whose output is fed into the digital resolver 26. Likewise, pulses appearing at one of the alternating output points of flip-flop 88 may be selectively fed into the optional roll compensator 96 by closing switch 98. The output of the optional roll compensator 98 is fed along with the output from the other output point of flip-flop 88 to inputs of the optionally included OR gate 100 whose output is fed into the digital resolver 26.

The vector computer 24 of FIG. 3 operates satisfactorily when the major aircraft-referenced component of the aircraft velocity lies along the heading direction. However, when the major velocity component of the aircraft velocity lies across heading, as when severe head or cross wind conditions are being experienced or as when a helicopter is hovering, it may be necessary to subtract the frequency shifts of beams $D_1$ and $D_2$ and to add the frequency shifts of beams $D_3$ and $D_2$ in order to get accurate representations of the actual aircraft-referenced components of velocity. To this end, an alternate embodiment computer 24' shown in FIG. 4 includes means to sense whether or not a given Doppler beam is experiencing an increased or decreased frequency shift upon reflection and includes means to compare the shift directions and select the proper combinations of Doppler shift frequencies in order to provide a pair of outputs respectively proportional to the actual aircraft movement along heading and the aircraft movement across heading even when the major component of aircraft movement lies across heading.

Figure 4:
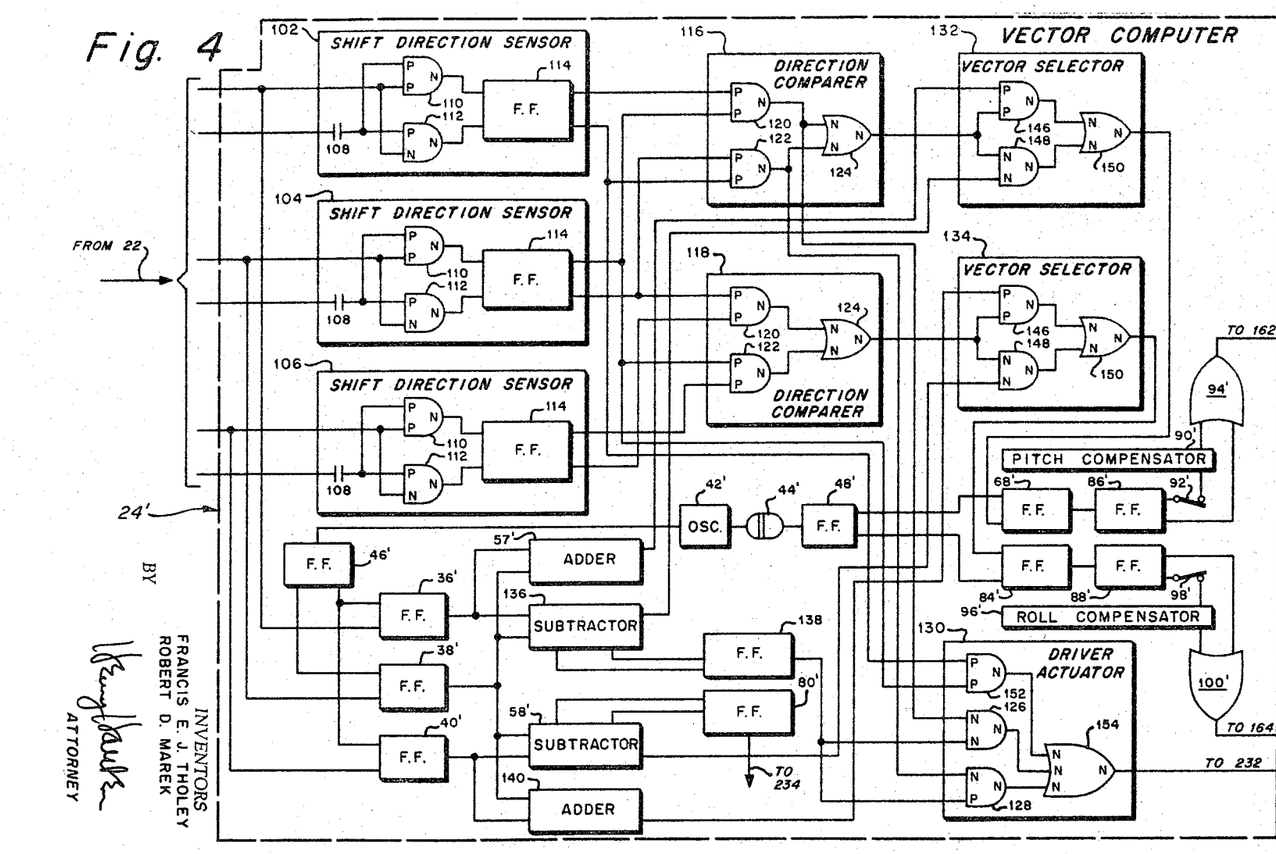
FIG. 4 is a more detailed block diagram of an alternate form of digital vector computer as employed in the Doppler pulse processor of FIG. 1.

As indicated above, each reflected beam was received by a respective antenna 12 and respectively mixed with samples of the transmitted frequency from the local oscillator 18 in the mixer 16 to provide upon detection and amplification a pair of square wave outputs one of which was 90° out of phase with the other. These pairs of square wave signals are fed into respective beam shift direction sensors 102, 104, and 106, of which only sensor 102 will be described since all of the beam shift direction sensors are identical.

The phase-shifted square wave is fed through capacitor 108 for differentiation, the differentiated output being fed to positive-responsive inputs of the AND gates 110 and 112. The other square wave in the pair is fed to a positive responsive input of AND gate 110 and to a negative response input of AND gate 112. The outputs of AND gates 110 and 112 are fed respectively to the set and reset inputs of flip-flop 114 which in turn produces a positive signal at one output terminal when in a set condition and, alternatively, a positive signal at the other output terminal when in a reset condition. Thus, as the in-phase square wave output from its respective amplifier 22 alternately activates the positive-responsive input terminal of AND gate 110 and the negative-responsive input terminal of AND gate 112, capacitor 108 produces from its phase-shifted square wave input a series of alternatively positive and negative pulses which are applied to the respective positive-responsive input terminals of AND gates 110 and 112.

When the phase-shifted square wave lags the other square wave, a positive pulse from capacitor 108 appears at one input of AND gate 110 while the other input thereof is positive; and the gate 110 creates in response thereto a pulse to set flip-flop 114. Since capacitor 108 will not produce a positive pulse while the in-phase square wave is in the negative portion of its cycle, no pulses will be emitted by AND gate 112 to reset flip-flop 114. Conversely, if the phase-shifted square wave leads the in-phase square wave, only the AND gate 112 will be activated to produce a pulse thereby maintaining flip-flop 114 in reset condition, since the in-phase wave, in this case, will always become negative before capacitor 108 produces a positive pulse.

The output signals of the sensors 102, 104 and 106 are fed into a pair of similarly constructed direction comparers 116 and 118, one of which will be described. The indications that the phase-shifted square waves representative of the shifts of $D_1$ and $D_2$ are lagging their respective other waves are fed to the inputs of AND gate 120 which produces an output when the Doppler shifts of $D_1$ and $D_2$ are in the same direction, as for example, when such shifts both represent respective increases in $D_1$ and $D_2$ frequencies. Similarly, the indications that the phase-shifted square waves produced from $D_1$ and $D_2$ are leading their respective other waves are fed to the inputs of AND gate 122 which produces an output when the frequency shifts of $D_1$ and $D_2$ represent respective frequency decreases. The output of AND gates 120, 122 are fed to OR gate 124 and, differing from comparer 118, also respectively to AND gate 126 and AND gate 128 of a relay driver actuator 130. The OR gate 124 always produces a positive output unless the Doppler shifts of $D_1$ and $D_2$ both represent either respective frequency increase or respective frequency decrease, which OR gate output is fed into vector selector 132.

Similarly, direction comparer 118 always produces a positive output which is fed into vector selector 134 unless the Doppler shifts of $D_2$ and $D_3$ both represent either increases or decreases in their respective frequencies.

The modified vector computer 24' also contains the same circuitry as computer 24 in that a subtractor 58' provides a serial output of negative pulses proportional in number to the difference between the frequency shifts of $D_2$ and $D_3$ while its associated flip-flop 80' provides a signal which indicates whether the frequency shift of $D_2$ is larger than the frequency shift of $D_3$. Similarly, an adder circuit 57' provides a series of positive pulses which are proportional in number to the sum of the frequency shifts of $D_1$ and $D_2$. An additional subtractor 136 provides a serial output of negative pulses proportional in number to the difference between the Doppler shift frequencies of $D_1$ and $D_2$, while its associated flip-flop 138 provides alternate outputs depending upon which of the shifts of $D_1$ and $D_2$ is the greater which are fed to positive and negative responsive input terminals respectively of AND gates 128 and 126 of relay driver actuator 130. An adder 140 provides an output having positive pulses proportional in number to the sum of the shifts of $D_2$ and $D_3$.

The function of the vector selectors 132 and 134 is to automatically select for distribution to respective flip-flops 68' and 84' on a basis of whether the certain beams respectively have an increased or a decreased frequency shift the appropriate combinations of beam frequency shifts for the outputs from the computer 24' representing aircraft movements along heading and across heading.

The positive pulses from adder 57' are fed to AND gate 146 of the vector selector 132, the negative pulses from subtractor 136 are fed to AND gate 148, and the output of the direction comparer 116 is fed to both AND gates 146 and 148. When AND gate 146 is receiving a positive signal from the direction comparer 116, which indicates that the frequency shifts of $D_1$ and $D_2$ represent neither simultaneous frequency increases nor simultaneous frequency decreases, the positive pulses from the adder 57' activate emission of a similar pulsating output which is fed through OR gate 150 to the reset of flip-flop 68', the number of pulses being proportional to the aircraft movement along heading. However, if the direction comparer 116 is emitting a negative signal indicating that the frequency shifts of $D_1$ and $D_2$ both represent either respective frequency increases or respective frequency decreases, the negative pulses from subtractor 136 are the ones which activate emission of a similarly pulsating output by the OR gate 150.

Similarly, the outputs of subtractor 58', adder 140 and direction comparer 118 are fed into the vector selector 134 whose output is fed to flip-flop 84', the pulses being proportional to the aircraft movement across heading. The pulses from the subtractor 58' are passed or simulated when the frequency shifts of $D_2$ and $D_3$ both represent either frequency increases or frequency decreases, and the pulses from the adder circuit 140 are passed or simulated when the frequency shifts of $D_2$ and $D_3$ represent neither simultaneous frequency increases nor simultaneous frequency decreases.

The indication from shift direction sensor 102 that the $D_1$ frequency shift represents a decrease is fed to AND gate 152 of relay driver actuator 130 as is the indication that the shift of $D_2$ represents an increase. The OR gate 152 of the relay driver actuator 130 is actuated to emit a signal: when $D_1$ is experiencing a frequency decrease while $D_2$ is experiencing a frequency increase; when both $D_1$ and $D_2$ are experiencing a frequency increase and the shift of $D_2$ is larger than that of $D_1$; or when both $D_1$ and $D_2$ are experiencing a frequency decrease and the shift of $D_2$ is larger than that of $D_1$.

The oscillator 42' and its associated delay device 44' and flip-flops 46' and 48' function in the same manner as the above-described similar circuitry of computer 24 to achieve the similarly connected flip-flops 36', 38', 40', 68' and 84' noncoincidence in time between the pulses of the output of OR gate 94' representing aircraft movement along heading and the pulses of the output of OR gate 100' representing aircraft movement across heading, for these series of pulses are to be selectively combined in the digital resolver 26.

Figure 5:
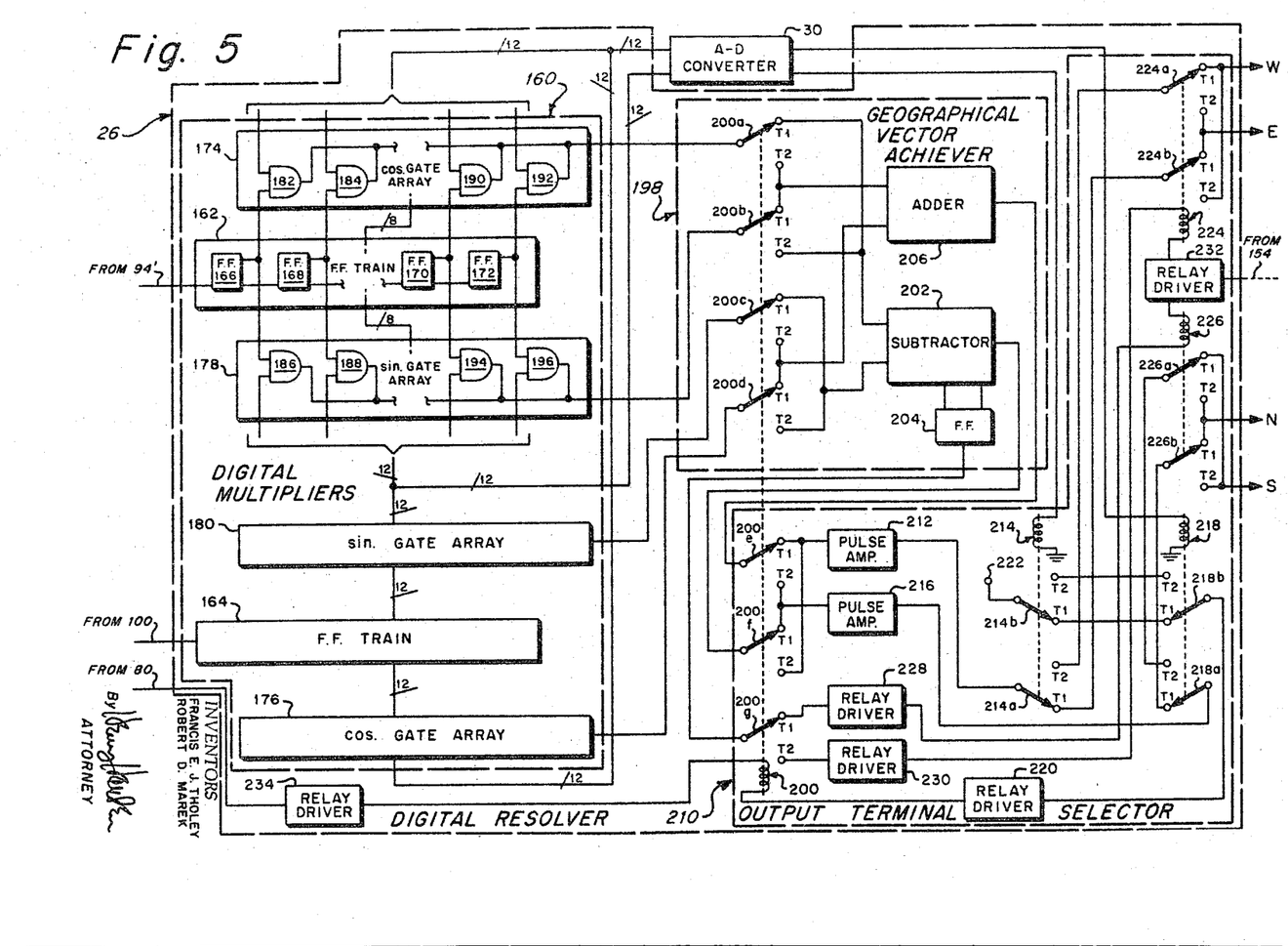
FIG. 5 is a more detailed block diagram and schematic of a digital resolver as employed in the Doppler data processor of FIG. 1.

Referring now to FIG. 5, a schematic block representation of a digital resolver 26 of the processor 10 is disclosed. The two pulse trains representative of aircraft movement along heading and of aircraft movement across heading are fed into the digital multipliers 160 of the digital resolver 26, the pulses proportional in number to the aircraft movement along heading being fed to a flip-flop train 162 and the pulses proportional to aircraft movement across heading being fed to an identical flip-flop train 164. The trains 162, 164 each contain a number of binary coupled flip-flops arranged in the manner of flip-flops 166, 168, 170, 172 of train 162 whereby the first pulse received by the train 162 sets flip-flop 166 to produce a set output pulse and the second pulse received by the train resets flip-flop 166 to produce a reset output pulse fed to set flip-flop 168 which, in turn, produces its set output pulse. Similarly, upon reception of a second pulse from the reset flip-flop 166, flip-flop 168 is reset and produces a reset output pulse fed to set the next flip-flop in the train.

The cosine gate arrays 174, 176 each receive the parallel digital information from the analog-to-digital converter 30 which is indicative of the magnitude of the cosine of the heading angle of the aircraft, while the sine gate arrays 178, 180 receive the parallel array of digital information from the converter 30 indicative of the magnitude of the sine of the heading angle of the aircraft. Each of the arrays contains twelve gates which correspond in number to the respective numbers of bits of digital information presented by the converter 30 for the magnitude of either the sine or cosine of the heading angle, there also being the same number of flip-flops in the respective flip-flop trains 162, 164. For example, the AND gate 182 of cosine gate array 174 and the AND gate 186 of sine gate array 178 are arranged to receive respective inputs from the converter 30, which gates each also receive the set output pulses from flip-flop 166. The AND gates 184 and 188 are similarly arranged, each receiving the set output pulses from their corresponding flip-flop 168. The remaining AND gates such as 190 and 192 of the cosine gate array 174 and 194 and 196 of the sine gate array 178 are similarly arranged.

The outputs of the AND gates of each of the arrays 174, 178, 180 and 176 are respectively tied together to provide respective array outputs which are fed into the geographical vector achiever 198, the outputs of arrays 174, 178, 180 and 176 being respectively fed to switches 200a, 200b, 200c and 200d of relay bank 200.

Converter 30 feeds either a conducting output or a non-conducting output to each of the gates of the appropriate gate array in a predetermined pattern which corresponds to either of the existing magnitudes of the sine and cosine of the heading angle of the aircraft. The operation of the digital multipliers 160 may be explained by observing what happens when a train of pulses enters the flip-flop train 162 having all its flip-flops in a reset condition. The first pulse received by the train 162 sets flip-flop 166 which produces a set output pulse fed to AND gates 182 and 186 of the cosine and sine arrays 174 and 178, the second pulse received by the train resets flip-flop 166 which produces a reset output pulse which is fed to set flip-flop 168 whose set output pulse is fed to AND gates 184 and 188, the third pulse received by the train 162 sets flip-flop 166 thereby producing a set output pulse fed to AND gates 182 and 186, and the fourth pulse received by the train 162 resets flip-flop 166 which produces a reset pulse which resets flip-flop 168 to produce a reset pulse which sets the next flip-flop in the train whose set output pulse is fed to corresponding gates in the arays 174, 178. It, therefore, appears that a flip-flop 166 output is fed to the corresponding array AND gates 182, 186 upon reception of every other pulse, a flip-flop 168 output is fed to corresponding AND gates 184, 188 upon reception by the train 162 of every fourth pulse, and so on, the number of the pulse which is passed by successive flip-flops to their corresponding gates successively being the next power of 2.

If the array AND gate receiving the output from its respective flip-flop in the flip-flop train is simultaneously receiving a conductive output from the converter 30, the pulse produced by its respective flip-flop will be passed to the respective switch in the geographical vector achiever 198. Conversely, if the array AND gate is receiving a non-conductive output from the converter 30, the pulse, if any, created by its respective flip-flop will not be passed to the geographical vector achiever 198. The specific pattern of conducting and non-conducting output bits of the converter 30 are arranged with respect to the flip-flops in the trains to pass only that portion of the pulses received by the train which corresponds to the product of the sine or cosine of the heading angle and the number of pulses received over a period of time.

For example, when the heading angle of the aircraft is 60°, the cosine thereof being 0.500, the AND gate 182 of the cosine gate array 174 is receiving a conductive output from the converter 30 while the other AND gates in the array 174 are receiving non-conductive outputs. Thereby only the pulses produced by flip-flop 166 to a setting thereof, i.e. 50% of the pulses received by the train 162, will be passed to the switch 200a. Similarly, the sine of that heading angle is 0.866, and the pattern of parallel digital information received from the converter 30 by the sine gate array 178 is such that all of the gates are receiving a conducting output except for those gates which respectively receive set outputs from the third, seventh and tenth flip-flops in the train. Consequently, every eighth pulse, every one-hundred twenty-eighth pulse and every one-thousand twenty-fourth pulse will not be passed to the switch 200b of relay 200. If a sequence of 4000 pulses is fed into the train 162, 533 of the pulses will not be passed, and therefore only about 0.866 times the number of pulses received by the train 162 will be passed.

Switches 200a and 200b respectively receive pulses proportional in number over a period of time to the number of pulses representative of the aircraft movement along heading times respectively the cosine of the aircraft heading angle and the sine of that angle, while the switches 200c and 200d receive pulses proportional in number to the number of pulses representative of aircraft movement across heading times respectively the sine of that angle and the cosine of that angle.

Each of the switches 200a through 200g are driven by the relay 200 to contact either their respective terminals T1 or T2. Terminals T1 of switch 200a and T2 of switch 200b are electrically connected with one input of a subtractor circuit 202 which may be identical to subtractor circuit 58 of the conductor computer 24. Similarly, terminals T1 of switch 200c and T2 of switch 200b are electrically connected with the other input of subtractor 202 whose output is fed to switch 200f. The flip-flop 204, connected with the subtractor 202 in the same manner that flip-flop 80 is connected with subtractor 58 of the vector computer 24, produces an output whenever the pulses received either from switch 200a or 200b exceed in number the pulses correspondingly received either from switch 200c or 200b, the output of flip-flop 204 being fed to switch 200g. Terminals T2 of switch 200a and T1 of switch 200b are electrically connected with one input of an adder 204 which may be similar to the adder 57 of vector computer 24; and terminals T2 of switch 200c and T1 of switch 200b are electrically connected with the other input. The output of the adder 204 is fed to switch 200e of the relay 200.

When the switches 200a through 200d, inclusive, are properly positioned, the geographical vector achiever 198 has as an output two series of pulses respectively proportional in number to the aircraft movement in North or South directions and the aircraft movement in East or West directions, which series as indicated above are fed into the switches 200e and 200f.

The switches 200e, 200f and 200g are functionally considered a part of the cardinal direction output point selector 210. Terminals T1 of switch 200e and T2 of switch 200f are electrically connected through a pulse amplifier 212 with switch 214a of relay 214. Terminals T2 of switch 200e and T1 of switch 200f are connected through a pulse amplifier 216 with the switch 218a of relay 218. The function of the pulse amplifiers 212, 216 is to provide pulses of appropriate shape and amplitude to activate the selected display device 32.

Relay 214 is driven so that the switches 214a and 214b contact their respective terminals T1 when the converter 30 provides an indication that the sine of the aircraft heading angle is positive and contact their respective terminals T2 when the sine of that angle is negative. Similarly, relay 218 is driven to drive its switches 218a and 218b to contact either respective terminals T1 or terminals T2 when the converter 30 provides an indication that the cosine of the aircraft heading angle is correspondingly either positive or negative.

Switch 218b is electrically connected with relay driver 220 whose output is fed to one input of relay 200 A D.C. power source 222 is electrically connected with switch 214b of relay 214, the respective terminals T1 and the respective terminals T2 of the switches 214b and 218b being respectively electrically connected together. Terminals T1 and T2 of switch 214a are respectively electrically connected with switches 224b and 224a of relay 224. Terminals T1 and T2 of switch 218a are respectively electrically connected with switches 226b and 226a of relay 226.

Terminals T1 of switch 226b and T2 of switch 226a are electrically connected together to form the North cardinal direction output terminal, while terminals T2 of switch 226a and T1 of switch 226b are electrically connected together to form the South output terminal. Terminals T2 of switch 224a and T1 of switch 224b are electrically connected together to form the East output terminal, and terminals T1 of switch 224a and T2 of switch 224b are electrically connected together to form the West output terminal.

Terminal T1 of switch 200g is electrically connected with relay driver 228 whose output is fed to one input of relay 226 to actuate movement of its switches from terminals T1 to terminals T2 in response to reception by the driver of an output from flip-flop 204 of the geographical vector achiever 198. Similarly, terminal T2 of the switch 200g is electrically connected with the relay driver 230 whose output is fed to one input of relay 224 to actuate movement of its switches from their respective terminals T1 to their respective terminals T2 in response to reception by that driver of an output from flip-flop 204.

When used with the computer 24, the other inputs of relays 224 and 226 may be connected with ground. However, when the modified computer 24' is to be used, those other inputs are each fed into relay driver 232 which receives the output, if any, of relay driver actuator 130 of the modified computer 24' and functions thereupon to inhibit the outputs of relay drivers 228 and 230. Similarly, relay driver 234 whose output is fed to the other input of relay 200 receives the output, if any, from flip-flop 80, 80' of computer 24, 24' and functions to oppose the output of relay driver 220. Thus, relay 200 will be activated to move its switches respectively from terminals T1 to terminals T2 either only if, when the frequency shift of beam $D_2$ is greater than the frequency shift of beam $D_3$, the sine and cosine of the aircraft heading angle have different polarities or only if, when the frequency shift of beam $D_3$ is greater than the frequency shift of beam $D_2$, the sine and cosine of the heading angle have the same polarity.

Assuming that the switches of relay 200 are contacting their respective terminals T1 and that the number of pulses from switch 200a exceeds that from switch 200c, relay driver 228 will be actuated to cause relay 226 to drive the switches 226a and 226b to contact their respective terminals T2 unless driver 232 reverses that relay 226 and also, incidentally, relay 224 when driver actuator 130 of the modified computer 24' is indicating any of: $D_1$ is experiencing a frequency decrease when $D_2$ is experiencing a frequency increase, the shift of $D_2$ is greater than that of $D_1$ when both are experiencing an increase, or the shift of $D_1$ is the greater when both are experiencing a decrease. Conversely, when the switches 200a through 200g are in contact with respective terminals T2 and the number of pulses from switch 200b exceeds that from switch 200d, relay driver 230 is similarly actuated to cause relay 224 to drive the switches 224a and 224b to contact terminals T2 or is similarly opposed by driver 232.

Of course, the relays and relay drivers of the digital resolver 26 may be replaced by appropriately activated electronic switches in a manner well known in the art.

The following example is pertinent to an understanding of the composite operation of the processor 10. Suppose that an aircraft is proceeding at a heading of 120° at a heading component velocity of one unit and a cross heading velocity component in a direction North 30° East of 1.732 units. $D_1$ will be experiencing a frequency increase attributable to the condition that both the movement components along and across heading are approaching, relatively speaking, the D, reflection point. $D_2$ will have a lesser increase by reason of the condition that its cross heading movement component is approaching the $D_2$ reflection point, while its heading movement component is departing the $D_2$ reflection point. $D_3$ will experience a frequency decrease attributable to the condition that both the movement components along and across heading are departing the $D_3$ reflection point. The computer 24′ which receives the Doppler shifts and in response to the sensing whether the respective beams are experiencing frequency increases or decreases is producing a pair of pulse trains each respectively proportional to the aircraft movement along heading, 1.0, and across heading, 1.73, which pulses are fed into the digital resolver 26. Since $D_1$ and $D_2$ are both experiencing frequency increases, the outputs from subtractor 136 and adder 140 of the computer 24′ will be directed by the vector selectors 132 and 134 to the respective vector flip-flop trains 162 and 164 in the digital resolver 26. Since sin 120° is positive, relay 214 will not be actuated to drive its switches away from terminals T1. Cos 120° is negative, and relay 218 will drive switches 218a and 218b to contact their terminals T2 so that the relay driver 220 receives no output from the D.C. source 222. Relay driver 234, although not opposed by driver 220, is not actuated to cause relay 200 to drive its switches away from terminals T1 since the magnitude of Doppler shift of $D_3$ is greater than that of $D_2$, as is indicated by flip-flop 80′ in the computer 24′. The output from switch 200a, 0.50 or heading velocity times cos 120°, is being subtracted from the output of switch 200c, 1.50 or cross heading velocity times sin 120°, by subtractor 202; while the output from switch 200b, 0.866 or heading velocity times sin 120° is being added to the output of switch 200d, 0.866 or cross heading velocity times cos 120°, by adder 204. Since the output from 200c is greater than that from 200a, the flip-flop 204 produces an output to actuate relay driver 228 to cause relay 226 to drive switches 226a and 226b to contact terminals T2. Relay driver actuator 130 is not being actuated to activate driver 232 to oppose driver 228 because $D_1$ and $D_2$ are both increasing and the $D_1$ shift is greater than the $D_2$ shift. Since driver 230 is disconnected from flip-flop 204, relay 224 is not actuated to drive its switches away from terminals T1. Consequently, the output of adder 204 is fed through terminal T1 of switch 200e and terminal T1 of switch 214a to terminal T1 of switch 224b whereby the pulsating adder output appears at the East output terminal. Similarly, the output of subtractor 202 is passed through terminal T1 of switch 200f and terminal T2 of switch 218a to terminal T2 of switch 226a whereby the pulsating subtractor output appears at the North output terminal. The digital resolver 26 is thereby producing from the computer outputs a pair of pulse trains respectively representative of aircraft movement in the East direction, 1.732, and in the North direction, 1.0, and is selectively directing those two pulse trains to the appropriate cardinal direction output points, East and North.

Figure 6:
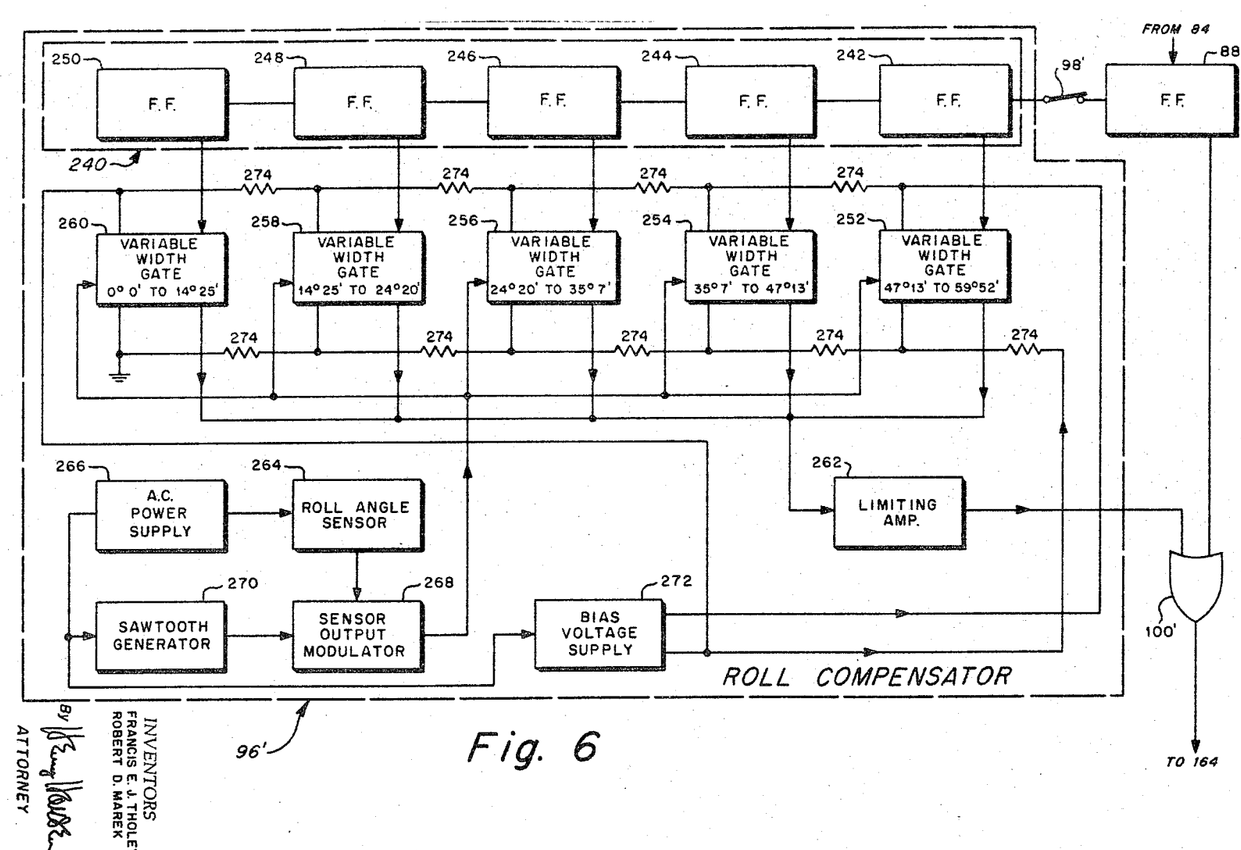
FIG. 6 is a schematic and block diagram of a roll compensator optionally includable in either vector computer of FIG. 3 or 4.

The pitch compensator 90 or 90′ as used in the vector computer 24 or 24′ is identical in circuitry to the roll compensator 96 or 96′, and a detailed description of the roll compensator 96′ as disclosed in FIG. 6 will now be undertaken. As described above, the flip-flop 88′ receives a series of pulses from the flip-flop 84′ proportional in number to the aircraft movement heading and, in response thereto, alternately distributes pulses to a first output point electrically connected through closed switch 98′ to the roll compensator 96′ and to a second output electrically connected with an input of the OR gate 100′. The pulses received by the roll compensator 96′ are fed into the binary-coupled flip-flop train 240 which is similar to the trains 162 and 164 of the digital multipliers 160 of the digital resolver 26. Each of the flip-flops 242, 244, 246, 248 and 250 of the train 240 produces a set output pulse upon changing from a reset to a set condition, which pulse is fed to a respective one of the variable width gates 252, 254, 256, 258, and 260, the pulse outputs of the gates all being fed through a limiting amplifier 262 to the other input of OR gate 100′. Consequently, variable width gate 252 receives a number of pulses equal to half the number received by the train 240 from flip-flop 242, gate 254 receives from its flip-flop 25 percent of the pulses received by the train, gate 256 receives 12.5 percent of the pulses received, gate 258 receives 6.25 percent of the pulses received, and gate 260 receives 3.125 percent of the pulses received.

A roll angle sensor 264, excited by voltage from an A.C. power supply 266, provides an output voltage which varies in magnitude as a function of the degree of angular deviation of the antenna array from level flight position, which output is fed into a sensor output modulator 268. A sawtooth generator 270, excited by the same A.C. power supply 266, provides a sawtooth output having a selected frequency such as 400 c.p.s. which is fed to the modulator 268 wherein the sawtooth output is superimposed upon the varying output of the roll angle sensor 264. The A.C. power supply 266 also excites the bias voltage supply 272 which provides a pair of D.C. voltages, one being greater than the other, which are each fed through appropriately sized biasing resistors 274 to the variable width gates 252, 254, 256, 258, and 260. The output of the modulator 268 is also fed to each of the variable width gates. Since the sensor 264, generator 270 and bias voltage supply 272 all receive power from the same supply 266, variations in the output of the power supply 266 do not affect the output of the compensator 96′.

It has been discovered that the degree of correction needed to correct the error experienced in the output of an uncompensated Doppler navigation system by reason of angular deviation of the antenna array from normal level flight position is approximately proportional to the magnitude of the component of aircraft movement in that deflected direction times the quantity, secant of the deviation angle minus one.

Figure 7:
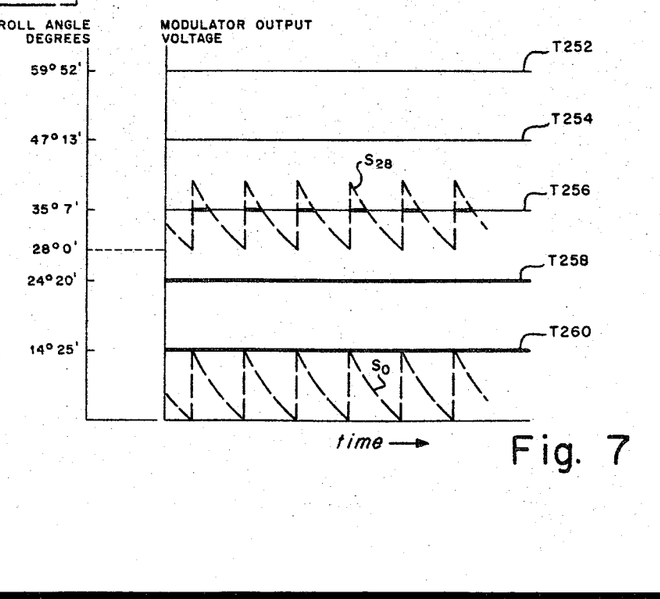
FIG. 7 is an illustrative voltage diagram of a sawtooth modulated input into the roll compensator of FIG. 6.

By referring to FIG. 7, the output of the modulator 268 and its use in the variable width gates can more easily be understood. The threshold voltage levels at which the variable width gates become operable to pass a pulse received from their corresponding flip-flops to the limiting amplifier 262 are preset by choice of the biasing voltages at five substantially equally spaced levels designated by the lines T252, T254, T256, T258 and T260. The sawtooth output of the generator 270 has a peak amplitude equal to the difference between the threshold levels of the variable width gates as shown by the wave $S_0$, which is the ouput of the modulator 268 when the roll angle sensor 264 has a zero output. While the use of a sawtooth having a substantially linear rate of decrease facilitates a reasonably close approximation of the desired pulse addition, the accuracy of the compensation can be improved by making the slope of decrease slightly concave as shown.

When the aircraft experiences an angular deviation in the roll direction of 28° from level flight, the output of the modulator 268 is represented by the wave $S_{28}$ It can be seen from FIG. 7 that the peaks of the sawteeth exceed the threshold level of variable width gate 256 approximately one-third of the time and exceeds the threshold voltage levels of variable width gates 258 and 260 all the time. Consequently, the variable width gate 258 will pass approximately 6.25 percent of the pulses received by the train 240, the gate 260 will pass an additional 3.125 percent of the pulses received, and gate 256 will pass approximately one-third of 12.5 percent of the pulses received, the total number of pulses passing through the amplifier 262 to the OR gate 100′ approximating 13.6 percent of the pulses received. Since the secant of 28° is 1.133, the number of pulses passed by the OR gate 100′ closely approximates the quantity secant of 28° minus one times the number of pulses proportional to the aircraft movement across heading.

It can be seen that as the aircraft experiences a greater roll than 28°, the output of sensor 264 will increase and the peaks of the sawtooth will exceed the threshold voltage of gate 256 for progressively greater periods of time thereby passing an increasingly larger percentage of the pulses fed to that gate.

When a roll of 28° is not compensated for, it can be shown that approximately only 88.3 percent of the desired number of pulses would be passed by the OR gate 100'. Even if the amount of pulse feedback were 10 percent less than that required to obtain an exact compensation, for a roll of 28°, the circuit would enable OR gate 100' to pass 98.8 percent of the actual desired number of pulses proportional to the aircraft movement across heading.

The pitch compensator 90, 90' of the computer 24, 24' may be substantially identical to the roll compensator 96' and may even provide a more accurate compensation than the roll circuit in that the threshold levels of the variable width gates of the circuit may be set closer together. For example, a convenient range of operating levels for the gates may be zero to 5½°, 5° to 9½°, 9 to 13½°, 13.9° to 18.4°, and 20.6° to 25.6°, it being anticipated that smaller amounts of pitch than roll will be experienced by an aircraft during operation. It has been found that by using a circuit like that described the amount of deviation of the approximately compensated output of OR gate 100' from an exactly compensated output would be about 0.05 percent for pitches 0° to 9°, 0.1 percent for pitches of 9° to 13½°, 0.2 percent for pitches of 13.5° to 16.5°, 0.5 percent for pitches of 16.5° to 20°, 1.0 percent for pitches of 20° to 25°, and 1.2 percent for pitches of 25° to 28°.

Alternatively, to the compensator circuit disclosed, the pitch and roll angles could be sensed by pitch and roll sensors whose outputs are converted to parallel digital form which in turn may be used to multiply the pulses received by the train 240 to achieve an output proportional to the quantity secant of the pitch or roll angle minus one times the number of pulses received in the same manner as was done with respect to the sine and cosine of the heading angle and the trains of pulses received from the computer 24 by the digital resolver 26. It can be seen that by the use of compensators which provide a number of pulses to be added to an existing pulse train to compensate for errors introduced by pitch and roll, a much more simple vector computer 24 may be utilized in that the solution of very complex equations which are functions of the pitch and roll angle is avoided.

From the foregoing description it can be seen that it has been provided a Doppler data pulse handling system which is much less complex than the systems heretofore known, which system is particularly well suited for use in helicopters. Further, it can be seen that the Doppler data pulse system described avoids the use of analog vector-resolvers. Further, the above described system lends itself well to microminiaturization so that a Doppler pulse handling system may be made which is much more compact than are the systems heretofore know. Further, it appears that there are no elements in the entire system which need adjustment other than the heading, pitch and roll angle sensors and, perhaps, the orientation of the antenna 12, and the system requires no alignment procedure prior to use.

It should be understood, of course, that the foregoing disclosure relates only to preferred embodiments of the invention and that numerous modifications or alterations may be made.

What is claimed is:

1. In an aircraft multi-beam Doppler navigation system having an antenna array, a digital Doppler pulse data processor comprising:

digital vector computer means connectable to receive shift pulse trains proportional to the Doppler shift of each Doppler beam and producing from the shift pulse trains received first and second pulse trains having frequencies proportional respectively to the rates of aircraft movements along orthogonal, aircraft-referenced axes; and digital multiplying means connectable to receive first and second parallel digital signals proportional respectively to the sine and cosine of the angle of deviation of one of said axes from a cardinal direction, connected to receive said first and second pulse trains from said digital vector computer and multiplying each of said first and second pulse trains by each of said first and second parallel signals to produce third, fourth, fifth and sixth pulse trains;

means connected to receive said third, fourth, fifth and sixth pulse trains for selectively adding and selectively subtracting respective selected ones of said third, fourth, fifth and sixth pulse trains to produce seventh and eighth pulse trains, the number of pulses of said seventh and eighth trains each being respectively proportional to orthogonal geographically-referenced aircraft movements; and means connected to receive said seventh and eighth trains for selectively distributing said trains to respective appropriate cardinal direction output terminals connectable with display means.

2. A digital Doppler pulse processor according to claim 1 wherein said digital vector computer further comprises:

means connected to receive said received shift pulse trains for combining selected ones of said trains to produce first and second pulsating outputs respectively having numbers of pulses proportional to the corresponding aircraft movement along a corresponding said axis; and first angular deviation compensating means connected to receive said first pulsating output for selectively adding pulses thereto responsive to the angular deviation relative to the level flight position of the system antenna array, the output of said compensating means being said first pulse train fed to said digital multiplying means, which output has a number of pulses proportional to deviation-compensated aircraft movement along one said corresponding axis.

3. A digital Doppler pulse processor according to claim 2 wherein said angular deviation compensating means comprises:

pulses diverting means having said connection to receive said first pulsating output for channeling pulses to a first terminal and to a second terminal;

means connected to receive the pulses appearing at said first terminal for passing a percentage of the pulses received thereby approximating the quantity secant of the angle of deviation of said system antenna array minus one to a third terminal; and circuit means connected to receive pulses from said second terminal and said third terminal for producing said compensating means output, said output having a number of pulses proportional to the sum of the numbers of pulses received from said second and third terminals.

4. A digital Doppler pulse processor according to claim 2 wherein said vector computer further comprises:

second angular deviation compensating means connected to receive said second pulsating output for selectively adding pulses thereto responsive to the angular deviation relative to the level flight position of the system antenna array, the output of said compensating means being said second pulse train fed to said digital multiplying means, which output has a number of pulses proportional to deviation-compensated aircraft movement along the other said corresponding axis.

5. A digital Doppler pulse processor according to claim 4 wherein first and second angular deviation compensating means each comprise:

pulse diverting means having said connection to receive its corresponding pulsating output for sequentially channeling pulses alternately to a first terminal and a second terminal;

means connected to receive pulses appearing at said first terminal for passing to a third terminal a percentage of pulses received thereby approximating the quantity secant of the corresponding angle of deviation of the system antenna array from level flight position minus one; and circuit means connected to receive pulses from said second terminal and said third terminal for producing a corresponding said compensating means output having a number of pulses proportional to the sum of the number of pulses received from said corresponding second and third terminals.

6. A digital Doppler pulse processor according to claim 1 wherein said digital vector computer means further comprises:

means combining selected ones of said shift trains received to produce, assuming the major aircraft velocity component lies along one of said axes, a first pulsating output having a number of pulses proportional to the magnitude of aircraft movement along said one axis and a second pulsating output having a number of pulses proportional to the magnitude of aircraft movement along the other axis, and to produce, assuming the major aircraft velocity component lies along the other said axis, a third pulsating output having a number of pulses proportional to the magnitude of aircraft movement along said one axis and a fourth pulsating output having a number of pulses proportional to the magnitude of the aircraft movement along said other axis;

signal means connectable to receive a pair of Doppler shift trains for each beam, said trains of each said pair being produced respectively from a first mixture of its received beam frequency and its transmitted beam frequency and from a second mixture of its received beam frequency and its phase-shifted transmitted beam frequency, said means sensing as to each beam the direction of aircraft movement relative to the reflection point thereof and providing therefor alternative beam direction signals; and comparing and selection means connected to receive said first, second, third and fourth pulsating outputs and said alternative beam direction signals for each beam for passing a selected pair of said pulsating outputs in response to reception of a corresponding selected combination of said beam direction signals, the outputs passed being said first and second pulse trains.

7. The digital Doppler pulse processor of claim 6 wherein said digital vector computer means further comprises:

angular deviation compensating means connected to receive from said selection means one of said pulsating outputs of said selected pair for selectively adding pulses thereto in response to the angular deviation relative to level flight position of the system antenna array, the output of said compensating means being the corresponding one of said first and second pulse trains fed to said digital resolver and said output having a number of pulses proportional to the deviation-compensated aircraft movement in said corresponding direction.

8. A digital Doppler pulse processor according to claim 6 wherein said signal means for each Doppler beam comprises:

first AND gate means having an input responsive to signals of one polarity connectable to receive an alternating said Doppler shaft train produced from said first mixture for producing an output;

second AND gate means having an input responsive to signals of an opposite polarity connectable to receive the last said Doppler shift train for producing an output;

differentiating means connectable to receive an alternating said Doppler shift train produced from said second mixture, said differentiating means having its output terminal connected with other respective input terminals of said first and second AND gates which are responsive to signals of said one polarity; and flip-flop means connected to receive at one input terminal the output of said first AND gate and connected to receive at another input terminal the output of said second AND gate, said flip-flop having a beam direction signal appearing at a first ouput terminal when an output is received from said first AND gate and having a beam direction signal appearing at an alternate output terminal when an output is received from said second AND gate, the said output terminals of said flip-flop being electrically connected with said comparing and selection means.

9. A digital Doppler pulse processor according to claim 1 wherein said digital vector computer means further comprises:

digital adder means connected to receive shift pulse trains of a first selected pair of beams for adding said trains to produce one of said first and second pulse trains; and digital subtractor means connected to receive shift pulse trains of a second selected pair of beams for subtracting said trains to produce the other of said first and second pulse trains.

10. A digital Doppler pulse processor according to claim 9 wherein said digital vector computer means further comprises:

means connected to receive said received shift pulse trains for passing said trains and achieving noncoincidence in time between the respective pulses of said first selected pair and between the respective pulses of said second selected pair, the outputs of said means being respectively fed to said digital adder and said digital subtractor.

11. A digital Doppler pulse processor according to claim 10 wherein the said digital subtractor means comprises:

first delay means connected to receive one of said second selected pairs of beam shift pulse trains for producing a similar first delayed output having pulses which are noncoincident in time with those of said train received thereby;

second delay means connected to receive the other of said second selected pair of beam shift pulse trains for producing a similar second delayed output having pulses which are noncoincident in time with those of said train received thereby;

flip-flop means connected to receive said first and second delayed outputs for producing a first flip-flop output when a pulse in said first delayed output has been received and a second flip-flop output when a pulse in said second delayed output has been received;

first AND gate means connected to receive said one of said second selected pair of trains and said first flip-flop output for passing pulses of said one of said second selected pair of trains when said first flip-flop output is being received;

second AND gate means connected to receive said other of said second selected pair of trains and said second flip-flop output for passing pules of said other of said second selected pair of trains when said second flip-flop output is being received; and OR gate means connected to receive the said pulses passed by said first and second AND gate means for passing same, the output of said OR gate means being said other of said first and second pulse trains.

12. In a Doppler navigation system for an aircraft including means for producing Doppler shift pulse trains for first, third, and second Doppler beams respectively transmitted and received along a first line extending downward, forward and laterally to one side of the aircraft, a third line extending downward, rearward and laterally to the opposite side, and a second line extending downward whose reflection point is aligned along heading with that of said first beam and across heading with that of said third beam, said navigation system also including means providing first and second parallel digital signals proportional respectively to the sine and cosine of the heading angle of the aircraft and third and fourth digital signals respectively indicating the polarities of said sine and cosine, a Doppler pulse data processor comprising:

first selective delay means connectable to receive the Doppler shift pulse trains of said first, second, and third beams for passing said shift trains and delaying the second beam shift pulses relative to those of both said first and third beam shift trains to achieve noncoincidence in time therebetween;

first combining means connected to receive trains from said selective delay means for combining the pulses of said first beam shift train with the pulses of said delayed second beam shift train to produce a first serial output of pulses proportional in number over a time period to the sum of the numbers of pulses of those beam shifts combined;

second combining means connected to receive trains from said selective delay means for combining the pulses of said third beam shift train with pulses of said delayed second beam shift to produce a second serial output of pulses proportional over a time period in number to the difference between the numbers of pulses of those beam shifts combined, said second combining means further providing a first direction signal indicative of that pulse train combined thereby which has the greater number of pulses therein over a time period;

second selective delay means connected to receive said first and second serial outputs for passing said outputs, the pulses of one of said outputs being delayed relative to the pulses of the other to achieve noncoincidence in time therebetween;

digital multiplying means connected to receive from said second selective delay means said first and second serial outputs and connectable to receive the first and second parallel digital signals respectively proportional to the heading angle sine and cosine for producing first, second, third, and fourth component outputs having pulses correspondingly proportional in number to the quantities of the sine and cosine of the heading angle respectively times the number of pulses in said first serial output and to the quantities of the sine and cosine of said angle respectively times the number of pulses in said second serial output;

first circuit means connected to receive a first pair of selected component outputs for combining said component outputs to produce a first combination output having pulses proprotional in number to the sum of the numbers of pulses in said selected component outputs;

second circuit means connected to receive a second pair of selected component outputs for combining said component outputs to produce a second combination output having pulses proportional in number to the difference between the numbers of pulses in the selected outputs of the said second pair, said circuit means further providing a second direction signal indicative of that pulse train combined thereby which has the greater number of pulses therein over a time period; and third circuit means connected to receive said first and second combination outputs and said first and second direction signals and connectable to receive said third and fourth polarity indicating, digital signals for selectively directing said first and second combination outputs to respective selected cardinal direction output terminals in response to selected combinations of said first and second direction signals and said third and fourth polarity signals.

13. In an aircraft Doppler navigation system including means producing a train of pulses proportional to uncompensated aircraft movement in one direction, an angular deviation pulse compensator comprising:

diverting means connected to receive said train of pulses for channeling pulses to a first output terminal and to a second output terminal;

means connected to receive the pulses appearing at said first output terminal and responsive to the angle of deviation of the system antenna array from level flight position for passing to a third output terminal a percentage of the pulses received approximating the quantity secant of the angle of deviation minus one; and circuit means connected to receive the pulses from said second and third output terminals for producing an output having pulses proportional in number to the sum of the numbers of pulses from the said second and third output terminals.

14. An angular deviation pulse compensator according to claim 13 wherein the said means passing a percentage of the pulses received comprise:

flip-flop means connected to receive the pulses from said first output terminal for producing corresponding pulses at selected parallel output terminals thereof, numbers of pulses which are successively greater percentages of the total number of pulses received by said flip-flop means respectively appearing over a period of time at corresponding ones of said parallel output terminals;

angle signal means producing an analog output whose magnitude increases as a function of said angle of deviation of the system antenna array from level flight position;

a plurality of gating means, each of said means connected to receive both said analog output and the pulses appearing at a corresponding one of said parallel output terminals of said flip-flop means, successive said gating means being operable for pulse passing at successively greater relative analog output magnitudes, said gating means being collectively operable to pass to said third output terminal said percentage of the pulses received in response to the corresponding magnitude of said analog output.

15. An angular deviation pulse compensator according to claim 14 wherein said angle signal means comprises:

angle sensor means producing a sensor output whose magnitude increases as a function of said angle of deviation of the system antenna array from level flight position;

cyclical function generating means for producing a regular, cyclical output; and modulating means connected to receive said sensor output and said cyclical output for modulating said sensor output in accordance with said cyclical output, said modulated output being said analog output fed to said gating means;

said gating means each being operable to pass increasingly greater portions of the number of the pulses received from said corresponding parallel output as the amplitude of said analog output exceeds for correspondingly greater amounts of time that amplitude level at which said gating means is operable for pulse passing;

the number of pulses passed by a selected gate which at a given magnitude of analog output passes a selected portion of the pulses received plus the number of pulses passed by selected gates which are operable for passing all pulses received being that number of pulses corresponding to said percentage.

16. An angular deviation pulse compensator according to claim 15 wherein the said function generating means comprises a sawtooth wave generator whose sawtooth output has a frequency over a time period greater than the number of pulses received by said flip-flop means over said time period.

References Cited

UNITED STATES PATENTS

| | | | |
|---|---|---|---|
| 2,982,956 | 5/1961 | Meyer | 343—8 |
| 3,021,068 | 2/1962 | Ostroff | 235—150.27 X |
| 3,150,365 | 9/1964 | Wimberly et al. | 343—9 |
| 3,246,329 | 4/1966 | Burrows | 343—8 |
| 3,248,734 | 4/1966 | Weiss et al. | 343—112 |
| 3,296,578 | 1/1967 | Saxton et al. | 343—16 |

MALCOLM A. MORRISON, Primary Examiner

R. W. WEIG, Assistant Examiner

U.S. Cl. X.R.

343—7, 8